(12) United States Patent
Martick

(10) Patent No.: US 9,542,159 B1
(45) Date of Patent: Jan. 10, 2017

(54) INTEGRATION OF REVISION CONTROL SYSTEMS AND PROCESS TOOLS

(71) Applicant: SAP SE, Walldorf (DE)

(72) Inventor: Christian Martick, Berlin (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/747,516

(22) Filed: Jun. 23, 2015

(51) Int. Cl.
*G06F 9/44* (2006.01)

(52) U.S. Cl.
CPC . *G06F 8/10* (2013.01); *G06F 8/22* (2013.01); *G06F 8/35* (2013.01)

(58) Field of Classification Search
CPC .......................................................... G06F 8/10
USPC ........................................................ 717/101
See application file for complete search history.

(56) References Cited

U.S. PATENT DOCUMENTS

| | | | | |
|---|---|---|---|---|
| 8,418,147 B1* | 4/2013 | Odenwelder | ....... | G06F 11/3684 717/128 |
| 2010/0281458 A1* | 11/2010 | Paladino | ................... | G06F 8/71 717/106 |
| 2012/0017195 A1* | 1/2012 | Kaulgud | ............. | G06F 11/3692 717/101 |

* cited by examiner

*Primary Examiner* — Timothy A Mudrick
(74) *Attorney, Agent, or Firm* — Jones Day

(57) ABSTRACT

A system for software development includes a central server comprising a revision control system module; a process server including a process tool module; a local server including a local development environment; and an integration server including a mapping module. The revision control system module includes a plurality of branches. The process tool module is configured to create a ticket indicating a product requirement. The central server is configured to maintain and update the ticket that variably associates the development artifact with a respective one of the branches of the revision control system module. The integration server is configured to copy changes in the ticket stored on the revision control system to the ticket in the process tool module, and accordingly control transitions of the development artifact between the plurality of branches in the revision control system module of the central server.

19 Claims, 7 Drawing Sheets

INTEGRATION OF REVISION CONTROL SYSTEMS AND PROCESS TOOLS

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyrights whatsoever.

BACKGROUND

There are various recognized software development processes and methodologies. For example, the waterfall development methodology (i.e. linear methodology) provides a sequential approach to software development, according to which the development process is divided into various phases. These phases may include requirement analysis, software design, implementation, testing, integration, deployment and maintenance. Every phase of the development process is strictly defined in the beginning of the development process. For each of the phases, only if the particular requirements of the respective phase are met, can the byproduct of the respective phase advance to the next phase. Generally, the waterfall development methodology requires formal approvals and documentations in the beginning and at the end of each phase.

On the other hand, agile software development methodologies do not include the strict structure of, and are more flexible than, the water fall methodology. Agile processes adapt to changes of the project requirements and to particular needs of the project at any given moment. In other words, rather than creating formal documents to iterate and predict the requirements of the development project from beginning to the end, agile processes focus on the needs of the updated software as they evolve. In agile processes, the various phases are not strictly delineated in linear sequential fashion. For example, a testing phase is not necessarily a separate phase that is implemented only after completion of software design. Rather, testing may occur concurrently with designing and implementing other aspects of a development object.

Branching is an agile software development methodology, where each development element is assigned to a separate branch, with various development branches being worked on simultaneously. Branching provides a lot of flexibility, isolation and freedom for developers.

DETAILED DESCRIPTION

The waterfall development methodology is restrictive. For example, due to the strict structure of the development process, developers may not review and revise creations of previous phases after a subsequent phase has begun. Moreover, anticipating all of the design needs in advance of complex development projects is difficult, which can result in many of the development efforts being wasted. The agile software development methodologies also suffer from drawbacks. For example, the agile software development methodologies lack an overall project design. In the case of branching, the agile software development methodologies can result in multiple parallel developments that require tedious integration. Furthermore, when utilizing agile software development methodologies, it is hard to predict the amount of time and resources needed to complete a project. Lastly, due to the iterative nature of agile development, multiple rounds of testing are required.

Example embodiments of the present invention are directed to a system and method for facilitating software development, which offer a combination of advantages of both the waterfall and agile software development methodologies without many of their disadvantages. Example embodiments of the present invention relate to integration of revisions control systems and process tools.

Figure 1:
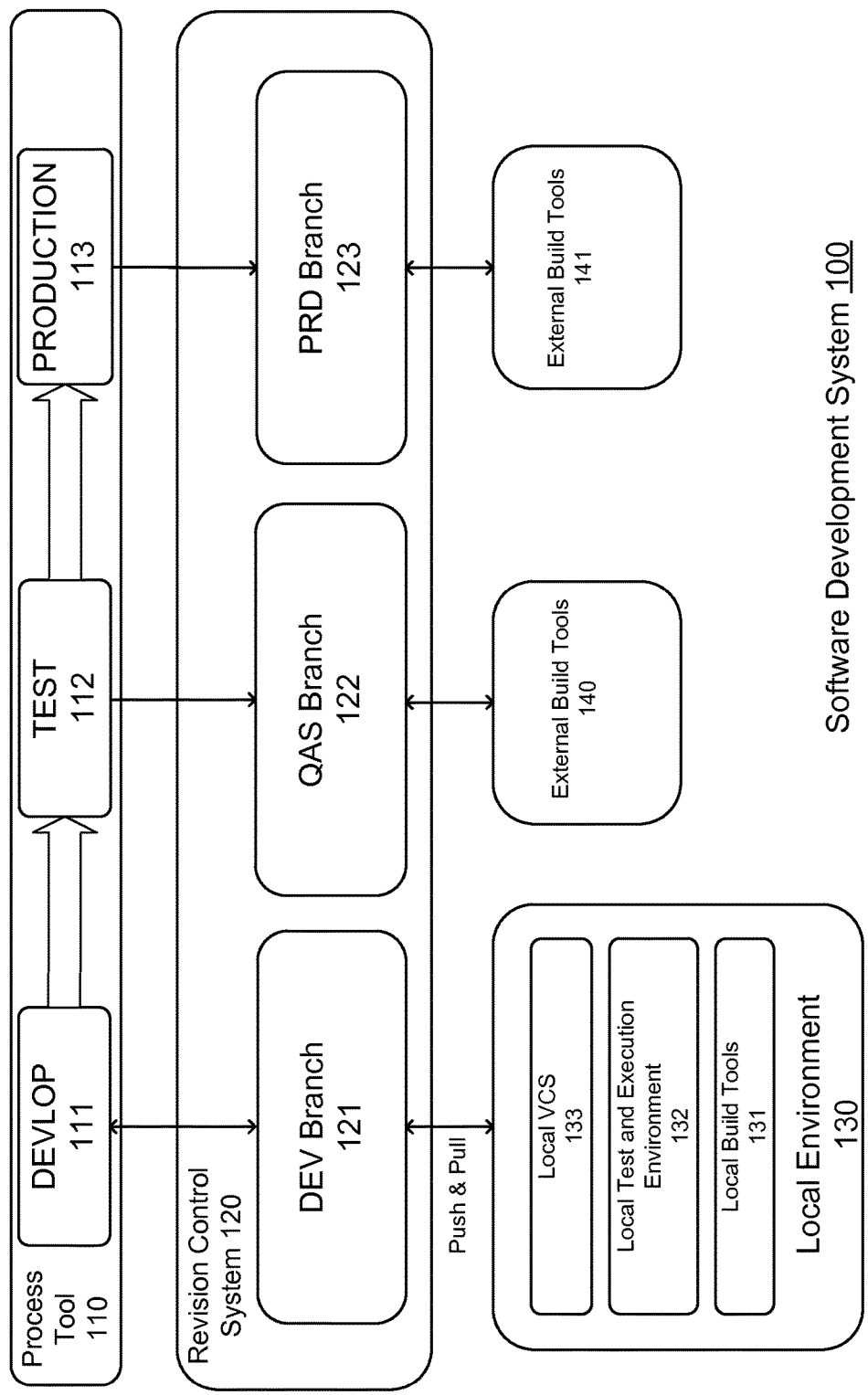
FIG. 1 illustrates a software development system for enterprise software according to an example embodiment.

FIG. 1 illustrates a software development system 100 for enterprise software according to an example embodiment. Software development takes place in various settings in the software development system 100. For example, in an example embodiment, the development takes place using both a local setting and a central setting. At the same time, the development process is being monitored and governed by a project manager.

The central setting includes a process tool 110 and a revision control system ("RCS") 120. The process tool 110 is a module on a server referred to herein as a process server and provides a project manager with information about the current state of a development artifact in a development process. Process tool 110 assists the project manager in monitoring the development process and governing it. For example, the process tool 110 includes information about product requirements and whether these requirements have been assigned to developers for development. The process tool 110 can also include information about the development artifacts that have been developed in response to a product requirement, e.g., when they were developed, who worked on them, etc. The process tool 110 can also include information about the current development phase of a particular development artifact. There can be various development phases for each development artifact. For example, in an embodiment, the process tool 110 can track the development artifact in a DEVELOP phase 111, TEST phase 112, and PRODUCTION phase 113.

Based on the information provided by the process tool 110, the project manager can decide whether to start the next phase of the development process, e.g., testing or production. For example, in response to a product requirement, a developer has been assigned to work on a development artifact. Once the developer develops the development artifact, the process tool 110 shows the progress and a project manager can decide whether to submit the development artifact for testing. In other words, the project manager can decide whether the development artifact can enter into the TEST 112 phase from the DEVELOP phase 111. By deciding the phase shifts, the project manager can govern and drive the development process.

The RCS 120 is a module on another server, referred to herein as the central server. RCS 120 can be a software component and facilitates storing and retrieval of various revisions or developments of a software source code. RCS 120 can also facilitate reconciling and merger of conflicts that may arise during parallel development of the same source code. In this embodiment, RCS 120 tracks changes made to the enterprise software in the central setting. RCS 120 also stores earlier versions of the development artifact. As a result, developers and managers can retrieve earlier versions of the development artifact on the RCS 120. The RCS 120 includes several branches.

In this example embodiment, RCS 120 can include a development branch 121 ("DEV"), a quality assurance system branch 122 ("QAS"), and a production branch 123 ("PRD"). Each branch is a repository of development artifacts and their prior versions. Sometimes multiple development artifacts can be assigned to a branch and sometimes only one development artifact can be assigned to a branch. There is a sequential relationship between DEV branch 121, QAS branch 122, and PRD branch 123, in that these branches include different phases of a development artifact. For example, when a development artifact is in development phase, the DEV branch 121 includes all of the versions of that development artifact in this phase. However, when the development artifact enters the testing phase, the QAS branch 122 includes various versions of the development artifact that has been submitted for testing.

Both the process server and the central server are networked via a network to an integration server 200. The network can be a local network or a global network, such as the Internet. The integration server 200 interconnects various software components of the process tool 110 on the process server to various software components of the RCS 120 on the central server.

The integration server 200 is configured to send notifications to the process tool 110 and the RCS 120. The process tool 110 and the RCS 120 are also configured to send notifications to the integration server 200. The notifications can include a binary message or more comprehensive messages including lengthier content. The integration server 200 also is configured to read information from or write information to the process tool 110 and the RCS 120. The integration server 200 also is capable of storing the ticket.

The central server includes the current state of the enterprise software and is capable of various functionalities such as storing the enterprise software, running the enterprise software, storing a ticket, interconnecting local development environments, and can trigger building and deploying development artifacts in a testing environment or for final product deployment. The central server can store information on itself or other databases. The central server can include various interfaces for local developers to interact with it and pull and push development artifacts, software, and source code to and from it. The process server also can store a ticket and has various interfaces for project managers to interact with the process server to create tickets.

The local setting includes a local environment 130. There can be one or a plurality of local environments 130 and each local environment 130 can be operated by one or a plurality of developers. The local environment 130, in an example embodiment, is provided on a local computing terminal and can include, for example, local build tools 131, a local test and execution environment 132, and a version control system ("VCS") 133. The local environment 130 is networked to the RCS 120 of the central server. The network can be a local network or a global network, such as the Internet. The local environment 130 can be located on one or more servers. The VCS 133 is a software component that facilitates storing and retrieval of various developments or revisions of a software source code. VCS 133 can be utilized in the local environment 130 (i.e., local setting) while the RCS 120 is utilized in the central setting.

The local VCS 133 is connected to the central server. When there are several local developers working independently, there can be multiple VCSs 133. The VCS 133 can communicate with the RCS 120 through the central server to pull information from the RCS 120 and push information to the RCS 120. The information can include, for example, development artifacts, source code, and/or software.

Figure 7:
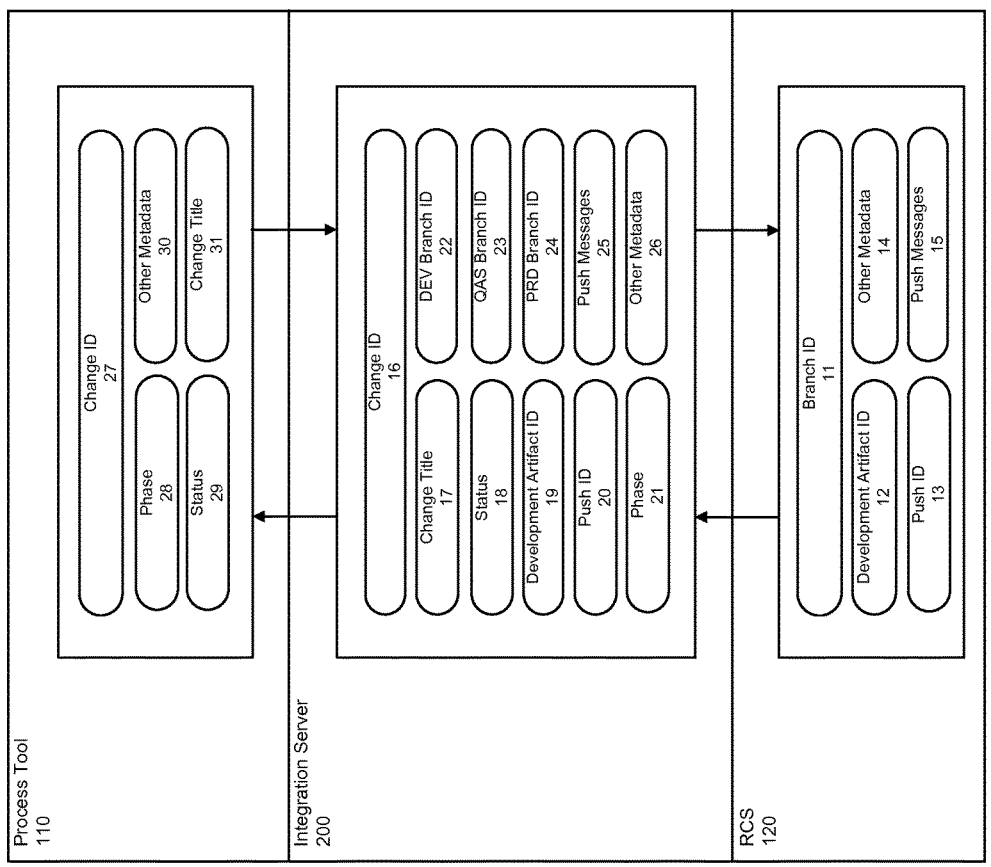
FIG. 7 illustrates the content of a ticket at the process tool, the integration server, and RCS according to an example embodiment.

In an example embodiment, the development process begins by a project manager creating a ticket and storing it on the process tool 110. The ticket can include information about product requirements of a development artifact or multiple development artifacts. The ticket can also include information about a reported problem or bug that needs to be fixed. Every ticket includes a unique Change ID which assists the integration server 200 in tracking the development artifact developed in response to the ticket. The project manager can also include information about the status of the development artifact in the ticket. For example, the project manager can include that the development artifact is in DEVELOP phase 111. The project manager can also begin the development process from other phases. For example, there can be development artifacts that were developed externally and only need to be tested within the internal testing environment. Thus, the project manager can start the process from the TEST phase 112. The ticket can also include other metadata. For example, the project manager can assign the project to a particular developer, or assign the project during a particular period of time in the future. Other information objects can also be included in the ticket at this stage. For example, the date that the ticket was created can be included in the ticket or the project manager can include a title for the ticket (i.e., Change Title). FIG. 7 illustrates an example of respective information objects included in a ticket at respective modules of the software development process.

Upon making and storing the ticket on the process tool 110, the process tool 110 sends a message or notification to the integration server 200. The message or notification indicates that a new ticket is available. In response, the integration server 200 obtains and stores the information in the ticket from the process tool 110. For example, the integration server 200 obtains the Change ID, Status and Other Metadata from the ticket on process tool 110.

Subsequently, the integration server 200 notifies the RCS 120 that a new ticket is available, in response to which the RCS 120 instantiates one of the branches on the central server. The integration server 200 assigns the branch instantiation a new Branch ID and stores some or all of the information from the ticket into the branch. The branch can be the DEV branch 121. The RCS 120 can also copy the ticket itself from the integration server 200. The RCS 120 also notifies a local developer about the availability of a new ticket.

In an example embodiment, upon notification, the local developer using the local environment 130 can submit to the RCS 120 a request to pull the ticket along with the current state of the enterprise software. Subsequently, the RCS 120 transmits the ticket and the current state of the software to the local developer. In an example embodiment, the local developer checks out the ticket on the central server. In an example embodiment, the central server provides the local developer with a URL link to the ticket and the local developer can view the ticket on its local environment 130.

The local developer begins working on the development artifact in the local environment 130 using the local build tools 131. Upon completion of design and implementation of the development artifact, the local developer can deploy the development artifact for testing in the local test and execution environment 132. Assuming that the testing is successful and that the development artifact satisfies the product requirements indicated in the ticket, the local developer is ready to push the development artifact back to the DEV branch 121 of the RCS 120. Using the Branch ID included in the ticket, the local developer pushes back the development artifact into the intended branch of the RCS 120.

The local developer can push the development artifact using the local VCS 133. The central server is configured to receive the development artifact and store it in the DEV branch 121 (which was created for the development artifact). The RCS 120 also is configured to update the content of the ticket. For example, the RCS 120 can update information in the ticket to indicate that the development artifact is received, when it was received, who pushed the artifact, the identity of the development artifact; etc. The RCS 120 also can include information about pushing the development artifact in the ticket. For example, the RCS 120 can ascribe a unique Push ID to the push of the development artifact and can include any messages associated with the push (e.g., push was or was not successful for an explained reason or Push Message). Alternatively or additionally, instead of storing some or all of the information in the ticket, the RCS 120 can store all or some of the information in another file in the DEV branch 121.

Subsequently, the integration server 200 obtains and stores the information of the ticket (or any other file including the information) on the central server. Then, with the new information, the integration server can update some of the information that were included from before. For example, since now there is a Push ID and Push Message, the integration server can conclude that the development artifact was successfully pushed back into the RCS 120. Thus, the integration server can update the Status and reflect that the DEVELOP phase 112 is complete. Then, the integration server 200 copies the relevant information to the ticket on the process tool 110.

After copying the information in the ticket from the central server to the integration sever 200, and then to the process tool 110, a project manager 1 can review the status of the development artifact. For example, the project manager 1 can see that a development artifact has become available and is ready for the next phase of the development process. The project manager 1 can modify or update the content of the ticket and trigger a phase shift of the development process. The triggering includes updating the information in the ticket to reflect advancement of the development process into the next phase at the process tool 110. For example, in an example embodiment, the project manager 1 can trigger testing of the development artifact. This can be done by updating the Status field in the ticket to reflect that the development artifact can enter into the TEST phase.

Once the development artifact is triggered to enter into the next phase, the process tool 110 sends a notification to the integration server 200. In response, the integration server 200 stores a copy of the ticket and notifies the central server about the ticket which included a phase shift. In response, RCS 120 creates a new branch instantiation, e.g., of the QAS branch 122, on the central server. The integration server 200 assigns this branch a unique Branch ID and stores some or all of the information included in the ticket in the branch. Also, the RCS 120 stores the development artifact in the QAS branch 122 of the RCS 120.

Subsequently, the RCS 120 can trigger building and deploying the development artifact into a testing environment. This building and deployment can be done by triggering external build tools 140 by providing the current state of the software and the development artifact. The external build tools 140 are located on a separate build server. If the development artifact is successfully built and deployed into the testing environment, the external build tools 140 on the build server notify the RCS 120 about this successful building and deployment. The RCS 120 in turn updates the ticket to reflect that the building and deploying of the development artifact into the testing environment has been successful (i.e., Other Metadata) and notifies the integration server 200. The integration server 200 stores this information and updates the content of the ticket on the process tool 110 to reflect this information. For example, the integration server 200 can update the Status of the ticket to "Built for Testing."

In an example embodiment, if the development artifact satisfies the functionality and quality requirements intended for it (and described in the ticket) in the testing environment, the external build tools 140 send a notification to the RCS 120. In response, the RCS 120 updates the content of the ticket to reflect this success. The RCS 120 also reports that the ticket has been updated to the integration server 200. The integration server 200 stores this information and sends it to the process tool 110. At this point, the testing phase is completed and the development artifact can move into the next phase of the development process. Moving the development artifact into the next phase of the development process must be triggered by a project manager. The project manager can update the content of the ticket to reflect that the development artifact can be moved into the next phase. For example, the project manager can update the Phase field to PRODUCTION.

In an example embodiment, if the development artifact does not satisfy the requirements of the testing environment, the external build tools 140 notify the RCS 120 of the failure. The RCS 120 updates the content of the ticket to reflect this information. The RCS 120 also notifies the integration server 200 that the content of the ticket has been updated. The integration server 200 stores the updated contents and also transmits it to the process tool 110. The project manager can decide over the fate of the development artifact. For example, the manager can decide that the development artifact has to move back into the previous development phase.

Moving the development artifact into the previous phase of the development process must be triggered by a project manager. The project manager can, for example, update the content of the ticket (i.e., Phase to DEVELOP) to indicate more work needs to be done on the development artifact by a local developer. When the content of the ticket is updated, the process tool 110 sends a notification to the integration server 200, which stores a copy of the content. The integration server 200 also sends a notification to the RCS 120. In response, using the branch ID stored in the ticket, the RCS 120 can move the development artifact into the previous DEV branch 121 of the RCS 120. The RCS 120 also can send a notification to the local developer and the local developer can request a pull.

Once it is triggered to move the development artifact into the next development phase (i.e., from TEST 112 to PRODUCTION 113), the process server notifies the integration server 200 that the content of the ticket has been updated. The integration server 200 in turn stores a copy of the content and notifies the RCS 120 about the ticket. The RCS 120 instantiates a new branch, e.g., a PRD branch 123. Then, the RCS 120 copies the development artifact from the QAS branch 122 into the PRD branch 123. The integration server 200 assigns a Branch ID to the PRD branch 123 and stores the ticket from process tool 110 in PRD branch 123. Then, the RCS 120 uses the external build tools 141 for building and deployment. The external build tools 141 can be on the build server or can be on a different server.

If the development artifact is successfully built and deployed, the external build tools 141 on the build server notify the RCS 120 about this successful building and deployment. The RCS 120 in turn updates the ticket to reflect that the building and deploying of the development artifact has been successful and notifies the integration server 200. The integration server 200 stores this information and updates the content of the ticket on the process tool 110 to reflect this information.

If the external build tools 141 cannot build and deploy the development artifact, the external build tools 141 notify the RCS 120 about this failure. The RCS 120 updates the content of the ticket to reflect this information (i.e., Other Metadata). The RCS 120 also notifies the integration server 200 that the content of the ticket has been updated. The integration server 200 stores the updated contents and also provides the updated contents to the process tool 110. The project manager can decide over the fate of the development artifact. For example, the manager can decide that the development artifact has to move back into the previous development phase.

Figure 2:
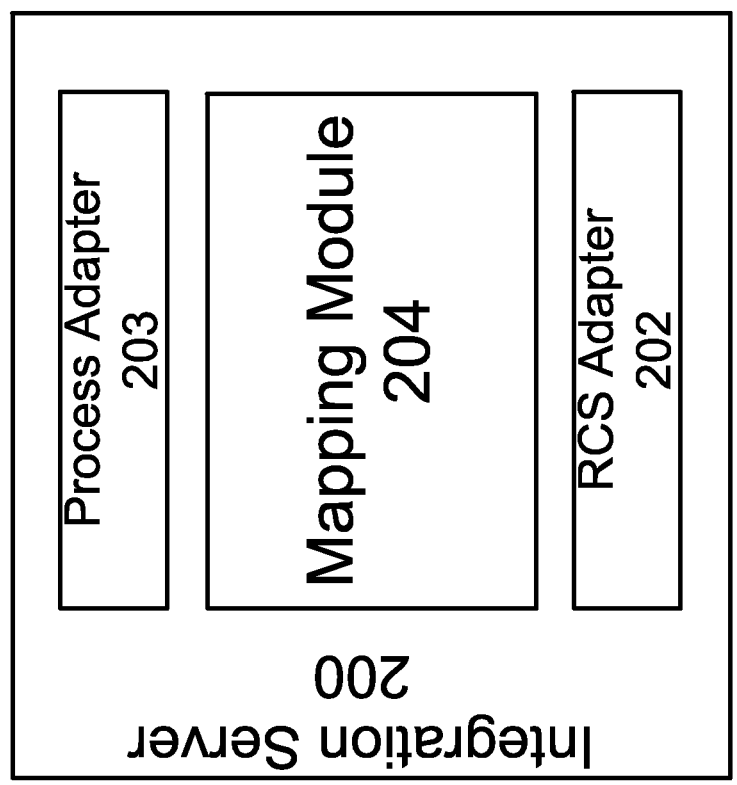
FIG. 2 illustrates various modules of an integration server according to an example embodiment.

FIG. 2 illustrates various modules of the integration server 200 according to an example embodiment. The integration server 200 is a computer server used to facilitate the interactions between the process tool 110 and RCS 120. The integration server 200 can reside on any physical server in communication with the process tool 110 on the process server and RCS 120 on the central server.

The integration server 200 is configured to interact with various RCSs and process tools. Although most RCSs and process tools share some aspects, each RCS and process tool has its own nuances. As a result, the integration server 200 has the RCS adapter 202 and the process adapter 203 to make it compatible with various RCSs and process tools. The RCS adapter 202 is a module on the integration server 200 which abstracts information from RCS 120, and the process adapter 203 is a module on the integration server 200 which abstracts information from the process tool 110. For example, FIG. 7 includes some of the information which can be abstracted by each adapter. The mapping module 204 is a module on integration server 200 and provides information from one adapter to the other. In order to communicate with the RCS 120, the integration server 200 utilizes public application programming interfaces (APIs) available for a given revision control system.

Figure 3:
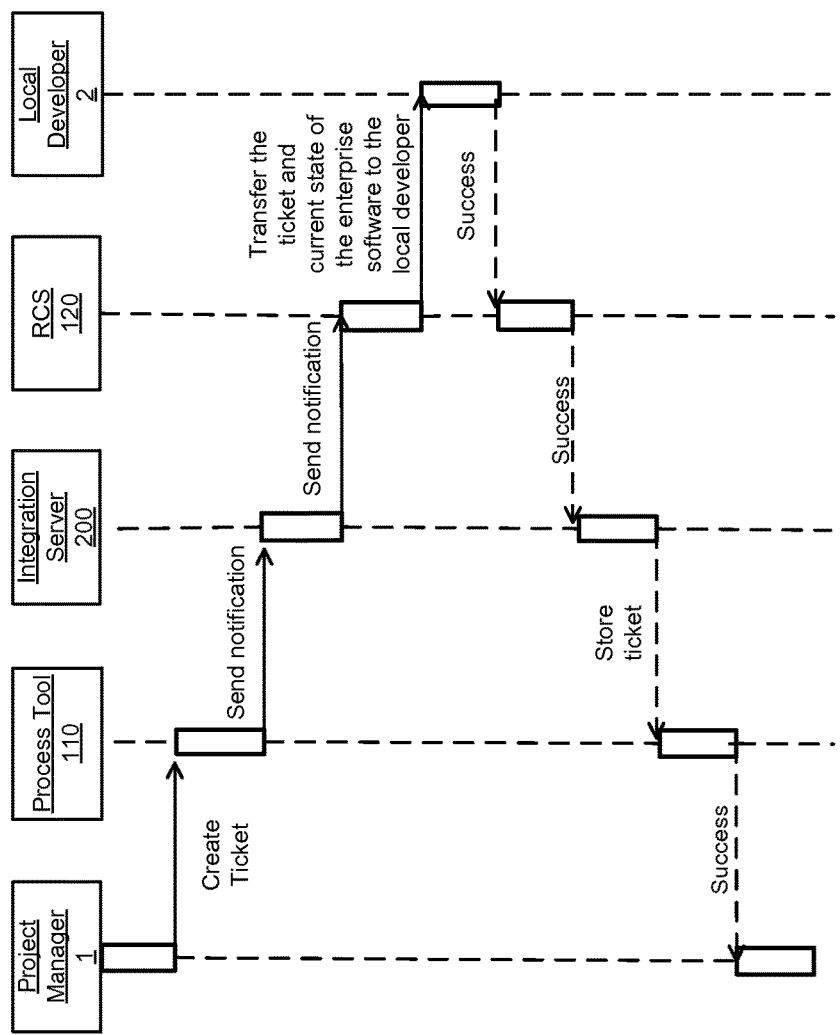
FIG. 3 illustrates a data flow and communications of information for pulling a ticket according to an example embodiment.

FIG. 3 illustrates a data flow and communications of information for pulling a ticket according to an example embodiment. In this example embodiment, a project manager 1 creates a new ticket which is stored on the process tool 110. The ticket reflects that in response to a product requirement, a development artifact has to be developed. As a result, the development artifact is in the DEVELOP phase of the development process. Once the ticket is created, the process tool 110 notifies the integration server 200 that a new ticket is available. The integration sever 200 stores the ticket and notifies the RCS 120 that a new ticket is available. The RCS 120 creates a new branch on the central server. The integration server 200 assigns a Branch ID to the branch and copies the ticket onto the branch. In an example embodiment, the new branch can be the DEV branch 121 of the RCS 120. In response, the central server notifies the local developer 2 that a new ticket is available. Upon receiving the notification, the local developer 2 can request a pull of the ticket as well as the current state of the enterprise software. Upon successful transmission of the ticket and the current state of the enterprise software to the local developer 2, the local developer 2 sends a success message to the RCS 120. The RCS 120 updates the content of the ticket to reflect that the local developer successfully received the ticket and the current state of the software. For example, the Status field in the ticket can be updated to "ticket received." The RCS 120 can also communicate a success message to the integration server 200. Furthermore, upon detecting the success message, the integration server 200 saves the content of the ticket and also saves it to the process tool 110. The process tool 110 notifies the project manager 1 about the success in transmission of the ticket to the local developer 2. This way, the project manager 1 can be informed that the local developer 2 successfully received the ticket and can work on the development artifact, as requested. Alternatively, the project manager 1 can check the ticket and the Status field of the ticket shows that the local developer 2 received the ticket.

Figure 4:
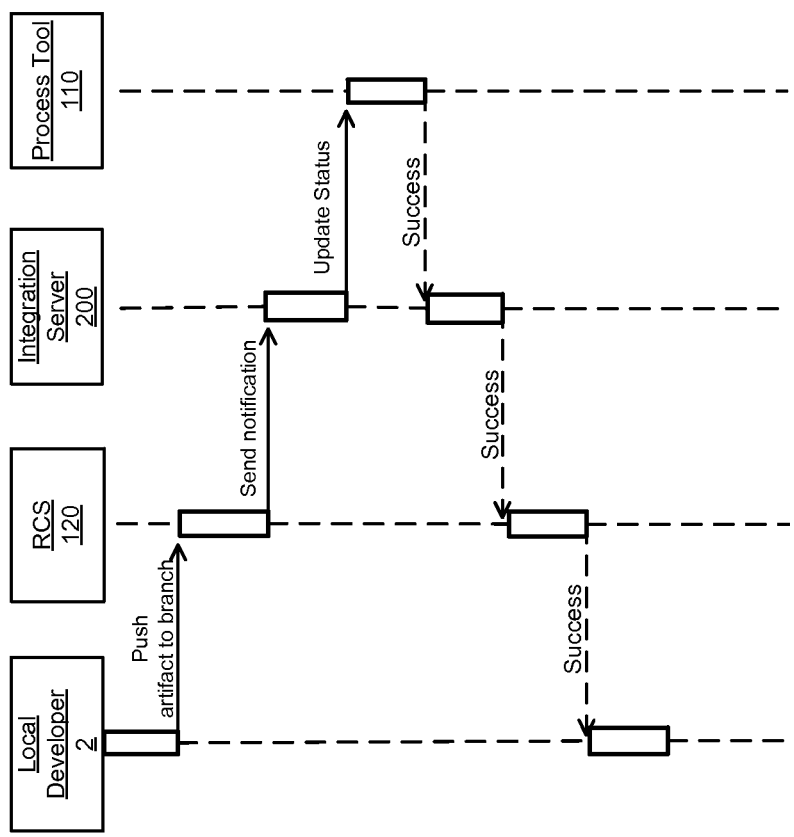
FIG. 4 illustrates a flow of data and communications for pushing a development artifact according to an example embodiment.

FIG. 4 illustrates a flow of data and communications for pushing a development artifact according to an example embodiment. In response to the requirements of the ticket received by the local developer 2 from the RCS 120, the local developer develops a development artifact. Subsequently, the local developer 2 requests a push of the development artifact to the RCS 120. The RCS 120 stores the development artifact in the appropriate branch. In an example embodiment, this branch is the DEV branch 121. The RCS 120 also updates the content of the ticket to reflect that the development artifact has been received. For example, Push ID, Push Message, and Development Artifact ID can be updated. The RCS 120 also sends a notification to the integration server 200. Then, the integration sever 200 retrieves this information from the RCS 120. Also, integration server 200 stores this information and sends the information to the process tool 110. If the content of the ticket is successfully updated on the process tool 110, it sends a success message to integration server 200, the integration server 200 sends a success message to the RCS 120, and the RCS 120 sends a success message to the local developer 2. This way, the local developer 2 recognizes that the project manager 1 is aware of the pushed development artifact.

Figure 5:
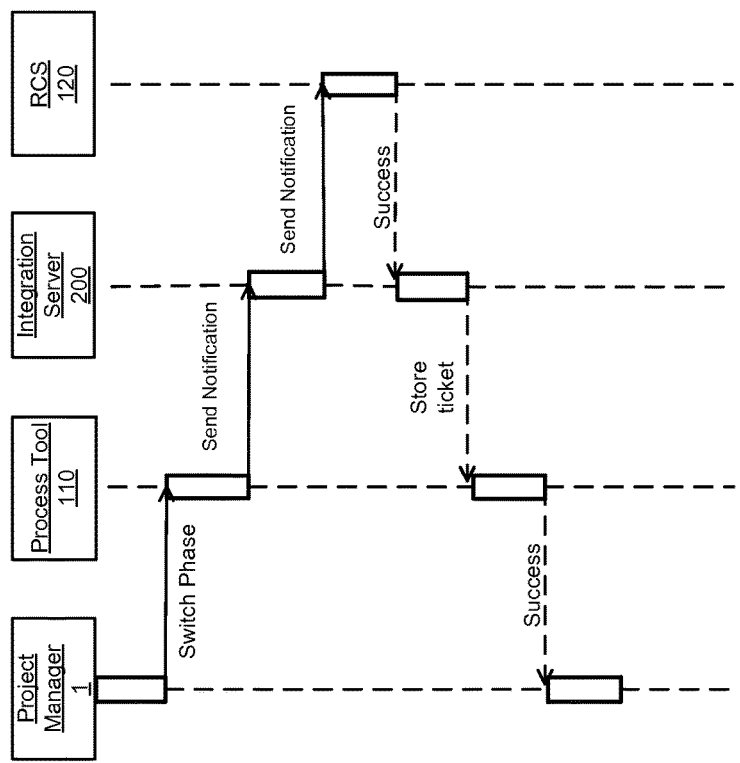
FIG. 5 illustrates a flow of data and communications for a phase switch according to an example embodiment.

FIG. 5 illustrates a flow of data and communications for a phase switch according to an example embodiment. The development phase of the development process is concluded when the content of the ticket is successfully updated on the process tool 110. Advancement of the development artifact into the next phase of the development process according to these embodiments can be triggered by the project manager 1. The project manager 1 can triggers a transition from the DEVELOP phase to the TEST phase by updating the ticket in the process tool 110. Upon updating the ticket, the process tool 110 notifies the integration server 200 about the update. The integration server 200 stores the content of the ticket and notifies the RCS 120. RCS 120 creates a new branch instantiation and notifies the integration server 200 about the branch instantiation. The integration server 200 assigns a Branch ID to the branch and copies the relevant parts or all of the ticket to the branch. This branch can be the QAS branch 122 of the RCS 120. The RCS 120 then copies the development artifact from the branch in which the development artifact was previously stored, i.e., the DEV branch 121, into the QAS branch 122. Subsequently, the RCS 120 triggers building and deploying the development artifact in the testing environment. The building and deployment of the development artifact in the testing environment can be done by the external build tools 140 on the build server.

Once triggered to be built and deployed in the testing environment, the external build tools 140 notify the RCS 120 about the success or failure of the building and deployment of the development artifact into the testing environment. The RCS 120 updates the content of the ticket to reflect this information. The RCS 120 can also notify the integration server 200 that the ticket has been updated. The integration server 200 accordingly updates its locally stored copy of the ticket and sends the update to the process tool 110. Once the ticket is successfully updated, the process server sends a success message to the project manager 1. The message indicates that the development artifact was successfully build and deployed in the test environment.

If the building and deployment is not successful, upon notification of the external build tools 140, the RCS 120 updates the content of the ticket to reflect this information. The central server can also notify the integration server 200 of the update in the ticket. The integration server 200 accordingly updates its locally stored copy of the ticket and sends the update to the process tool 110. The process server can notify the project manager 1 of the failure. In this embodiment, the project manager 1 can decide the next action to be taken.

Once the quality and functionality testing is completed, the external build tools 140 notify the RCS 120 about the results. If the testing was successful, the RCS 120 updates the content of the ticket in the QAS branch 122 of the RCS 120 to reflect this information. The central server also notifies the integration server 200. The integration server 200 then updates its locally stored copy of the ticket and sends the update to the process tool 110. The process tool 110 sends a success message to the project manager 1. At this point, depending on the result of the tests, the development artifact is ready to be advanced into the next phase of the development process or reverted back into the development phase.

Figure 6:
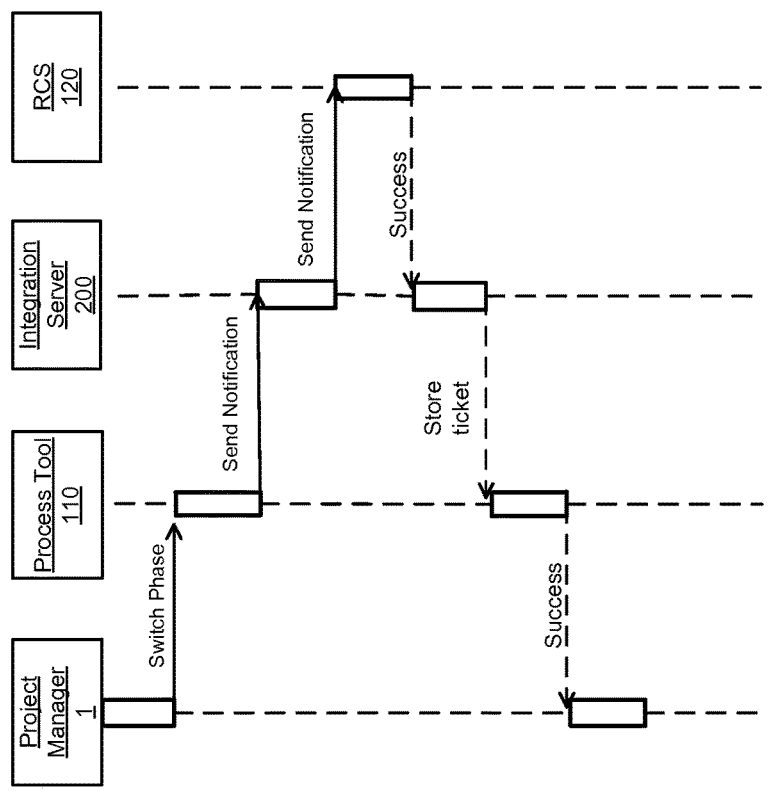
FIG. 6 illustrates a flow of data and communications for a second phase switch according to an example embodiment.

FIG. 6 illustrates a flow of data and communications for a second phase switch according to an example embodiment. In this embodiment, the project manager 1 triggers a phase switch after the testing phase of the development process. Similar to FIG. 5, this phase switch can also be triggered when the project manager 1 updates the content of the ticket. Upon updating the ticket, the process tool 110 notifies the integration server 200. The integration server 200 stores the changes and notifies the RCS 120. RCS 120 in turn makes a new branch instantiation on the RCS 120 and copies the development artifact from the previous branch. This branch can be the PRD branch 122 and the previous branch can be the QAS branch 123. The RCS 120 notifies the integration server 200 about the branch instantiation and the integration server 200 assigns a unique Branch ID to the branch and copies all or some of the content of the ticket in the branch. Subsequently, the RCS 120 triggers building and deploying the development artifact into the enterprise software. This building and deploying can be done by using the external build tools 141. The external build tools 141 can be on the build server or on another server.

The build server sends a notification to the RCS 120 regarding the success or failure of the building and deployment. The RCS 120 updates the content of the ticket in the PRD branch 123. The RCS 120 also notifies the integration server 200 of the change. The integration server 200 gathers the relevant information from the RCS 120 and stores this information on the process tool 110. The process tool 110 can send a success message to the project manager 1.

If the central server fails to build and deploy the development artifact into the enterprise software, the build server notifies the RCS 120, the RCS 120 notifies the integration server 200, and the integration server 200 notifies the process server, which in turn notifies the project manager 1. At this point, the project manager 1 can decide about the next development phase of the development artifact.

FIG. 7 illustrates the content of a ticket at the process tool 110, the integration server 200, and the RCS 120 according to an example embodiment. On the process tool 110, the ticket includes the following objects or fields: Change ID 27, Phase 28, Status 29, Other Metadata 30, and Change Title 31. The Change ID 27 is a unique identifier that refers to the ticket or the change requested. This information is provided by the project manager 1 when project manager 1 drafts the ticket or is randomly assigned. Nonetheless, every ticket has a different Change ID 27. The Change ID 27 can help distinguish tickets from each other and track the development artifact through the system. The Phase 28 is assigned by the project manager 1 at the process tool 110. There can be various development phases for each development artifact. For example, in an embodiment, the process tool 110 can track the development artifact in a DEVELOP phase 111, TEST phase 112, and PRODUCTION phase 113. However, a development artifact does not have to start with the DEVELOP phase. For example, a development artifact can be developed externally and be tested internally, in which case the Phase can start at TEST phase 112.

The Other Metadata field 31 can include additional information about the product requirements or the requirements for the development artifact. This field can include the assignment of the task to a particular developer, or assignment of the project during a particular period of time in the future. The field can include the date that the ticket was created. This field also can include any other information that can assist the project manager 1 in monitoring and governing the development process. The field also can include any other information that can help reviewing the development process in the future. The Status 29 can include information about the status of the ticket as of the last update. For example, Status 29 can be "assigned" after the ticket was issued to a particular developer. As another example, the Status 29 can be "issued but not assigned" if the ticket is issued but is not assigned to a developer. The project manager 1 sets the Status 29 in the outset; however, the Status can also be automatically assigned by the process tool 110. The Change Title 31 is optional. It provides a title for the ticket which can be set by the project manager 1.

At the RCS level (e.g., RCS 120 in FIG. 1), the ticket includes a Branch ID 11, Development Artifact ID 12, Push ID 13, Other Metadata 14, and Push Messages 15. Branch ID 11 is the identity of the branch of the RCS to which the development artifact is assigned. For example, when the local developer using the local VCS 133 pushes the development artifact to the DEV branch 121 of the RCS 120, the Branch ID 11 identifies the DEV branch in which the development artifact was saved. The Branch ID 11 can be set by the integration server 200 after a ticket has been issued and after the development artifact enters into a new development phase, which is triggered by a project manager 1.

The Development Artifact ID 12 can identify the actual development artifact which was developed in response to the ticket. Push ID 13 is a unique identifier that is associated with the pushing of the development artifact. Push Messages 15 can be a message associated with the push. For example, when the local developer 2 pushes a development artifact into the RCS 120, this act of pushing receives a confirmation code and the confirmation code is the Push ID 13. The push can be successful or unsuccessful. If the push is unsuccessful, for example, there can be an explanation as to why the push did not occur successfully. This explanation can be included in the Push Message 15.

The Other Metadata field 14 generally includes what was included in the Other Metadata 30 at the process tool 110. However, more information can be added to the field. For example, the local developer 2, at the local environment, can add comments in this field (which will be received by the RCS 120 and updated by it). This field can also be automatically populated by information about the time of development, the names of the individuals who worked on the development artifact, or other information for tracking the development history of the development artifact. For example, upon receiving the development artifact, the RCS 120 can update this field.

On the integration server 200, the ticket can include the following fields: Change ID 16, Change Title 17, Status 18, Development Artifact ID 19, Push ID 20, Phase 21, DEV Branch ID 22, QAS Branch ID 23, PRD Branch ID 24, Push Messages 25, and Other Metadata 26. The integration server 200 brings together two sets of data maintained by the process tool 110 and the RCS 120. The integration server 200 makes available the data form each module to the other. The integration server 200 also becomes a repository for the data which can be used in the future for reviewing purposes.

In the first instance, the integration server 200 retrieves the Change ID 16, Change Title 17, Status 18, Phase 21, and Other Metadata 26 from the process tool 110. The integration server 200 also retrieves the Development Artifact ID 19, Push ID 20, and Push Messages 25 from the RCS 120. DEV Branch ID 22, QAS Branch ID 23, and PRD Branch ID 24 are retrieved from the Branch ID 11. For example, if the branch which the Branch ID 11 is associated with is a DEV branch, the Branch ID 11 can be stored as a DEV Branch ID 22; if the branch which the Branch ID 11 is associated with is a QAS branch, the Branch ID 11 can be stored as a QAS Branch ID 23; if the branch which the Branch ID 11 is associated with is a PRD branch, the Branch ID 11 can be stored as a PRD Branch ID 24.

The integration server 200 has the ability to update some of these fields throughout the development process. For example, after a ticket is issued, the Status fields 29 and 18 can be "assigned." However, after a development artifact is pushed in response to the ticket, there can be a Push ID 20 and Development Artifact ID 19 associated with the development artifact. As a result, the integration server 200 can update the Status 18 to "developed and pushed," for example.

An example embodiment of the present invention is direct to communication between various modules on various servers. All of the communications between these modules can be conducted using the known communication protocols.

An example embodiment of the present invention is directed to one or more processors, which can be implemented using any conventional processing circuit and device or combination thereof, e.g. a Central Processing Unit (CPU) of a Personal Computer (PC) or other workstation processor, to execute code provided, e.g. on a hardware computer-readable medium including any conventional memory device, to perform any of the methods described herein, alone or in combination. The one or more processors can be embodied in a server or user terminal or combination thereof. The user terminal can be embodied, for example, as a desktop, laptop, hand-held device, Personal Digital Assistant (PDA), television set-top Internet appliance, mobile telephone, smart phone, etc., or as a combination of one or more thereof. The memory device can include any conventional permanent and/or temporary memory circuits or combination thereof, a non-exhaustive list of which includes Random Access Memory (RAM), Read Only Memory (ROM), Compact Disks (CD), Digital Versatile Disk (DVD), and magnetic tape.

An example embodiment of the present invention is directed to one or more hardware computer-readable media, e.g. as described above, having stored thereon instructions executable by a processor to perform the methods described herein.

An example embodiment of the present invention is directed to a method, e.g. of a hardware component or machine, of transmitting instructions executable by a processor to perform the methods described herein.

The above description is intended to be illustrative, and not restrictive, and although the above description provides details for purposes of clarity of understanding, it will be apparent that certain changes and modifications may be practiced within the scope of the following claims. The invention is not to be limited to the details given herein, but may be modified within the scope and equivalents of the following claims. For example, those skilled in the art can appreciate from the foregoing description that the present invention may be implemented in a variety of forms, and that the various embodiments may be implemented alone or in combination. Therefore, while the embodiments of the present invention have been described in connection with particular examples thereof, the true scope of the embodiments and/or methods of the present invention should not be so limited since other modifications will become apparent to the skilled practitioner upon a study of the drawings, specification, and following claims. For example, the present invention may be practiced according to the claims without some or all of these specific details. For the purpose of clarity, technical material that is known in the technical fields related to the invention has not been described in detail so that the present invention is not unnecessarily obscured.

What is claimed is:

1. A system for software development comprising:
    a central server comprising a revision control system module;
    a process server comprising a process tool module;
    a local server comprising a local development environment; and
    an integration server comprising a mapping module;
    wherein:
        the integration server is communicatively coupled to the process server and the central server and the local server is communicatively coupled to the central server;
        the revision control system module includes a plurality of branches;

the process tool module in configured to create a plurality of tickets indicating a product requirement;

the central server is configured to:

receive and store the tickets, and transmit at least one of the tickets to each of a plurality of local development environments that each includes a local, corresponding, and different version control system and that can each develop a respective development artifact, wherein the local version control systems respectively facilitates storing and retrieval of developments or revisions of a software source code;

receive the development artifacts back from the local development environments and store the received development artifacts, wherein the local development environments pushes the development artifact in response to the requirement of the ticket; and maintain and update the tickets that, for each ticket, variably associates the development artifact with a respective one of the branches of the revision control system module; and the integration server is configured to copy changes in the tickets stored on the revision control system to the ticket in the process tool module, and accordingly control transitions of the corresponding development artifacts between the plurality of branches in the revision control system module of the central server.

2. The software development system of claim 1, wherein the integration server is configured to provide a ticket, created by a project manager in the process tool module, to the central server for association with a first one of the branches of the revision control system of the central server.

3. The software development system of claim 2, wherein the central server transmits the tickets to the local development environments in response to a requests from the local development environments.

4. The software development system of claim 3, wherein, responsive to receipt by the central server of the development artifacts, the central server stores the development artifacts and updates the corresponding ticket.

5. The software development system of claim 4, wherein the central server is configured to notify the integration server of the updated tickets, and the integration server is configured to responsively copy the updated tickets into the process tool.

6. The software development system of claim 5, wherein, responsive to the project manager editing the tickets to reflect a shift in a software development phase of the corresponding development artifacts, the integration server is configured to notify the central server that the tickets have been edited.

7. The software development system of claim 6, wherein the integration server is configured to notify the central server that the tickets have been edited, responsive to which the central server is configured to update the reference to reassign the corresponding development artifacts and from the first branch of the revision control system into a second one of the plurality of branches of the revision control system.

8. The software development system of claim 7, wherein the revision control system can trigger deploying and building the development artifacts into a testing environment.

9. The software development system of claim 8, wherein the central server is configured to update the tickets stored at the central server to reflect a success of the building and the deployment of the development artifacts into the testing environment.

10. The software development system of claim 9, wherein the central server is configured to notify the integration server about the success of the building and the deployment of the development artifacts into the centralized testing environment and, upon receiving the notification of the success of the building and deployment, the integration server is configured to copy the edited tickets into the process tool.

11. The software development system of claim 10, wherein the central server is configured to update content of the tickets in the second branch of the revision control system to reflect a success of the testing of the development artifacts in the centralized testing environment.

12. The software development system of claim 11, wherein the central server is configured to notify the integration server of the success of the testing of the development artifacts in the testing environment, and, upon receiving the notification, the integration server is configured to update the tickets at the process server to reflect the success of the testing.

13. The software development system of claim 12, wherein, responsive to the project manager editing at least a portion of the tickets to reflect a shift in a software development phase of the corresponding development artifacts, the integration server is configured to notify the central server and the central server is configured to copy the corresponding tickets into a third branch of the revision control system.

14. The software development system of claim 6, wherein the integration server is configured to notify the central server of the change in the tickets, in response to which the central server is configured to update the reference to associate the development artifacts and the tickets with a third one of the plurality of branches of the revision control system.

15. The software development system of claim 7, wherein the third branch includes the enterprise software and the central server triggers an external build tool to build and deploy the development artifacts into the enterprise software.

16. A software development method, comprising:

storing a plurality of tickets created on a process tool in a branch of a revision control system using an integration server;

wherein the revisions control system has a plurality of branches;

sending the tickets to each of a plurality of different local developments using the revision control system and each having a local, corresponding, and different version control system, wherein the local version control systems respectively facilitates storing and retrieval of developments or revisions of a software source code;

developing a plurality of development artifacts in response to a requirement specified by the tickets;

pushing, by the local development environments, the development artifacts back into the branch of the revision control system;

updating the ticket on the revision control system;

copying the ticket to the process tool using the integration server; and deciding whether the development artifacts should enter the next development phase.

17. The software development method of claim 16, wherein a project manager updates the tickets on the process tool to move the corresponding development artifacts into the next phase of the development.

18. The software development method of claim 17, wherein upon updating the tickets, the development artifacts are moved into another branch of the revision control system and subsequently tested for quality and functionality.

19. The software development method of claim 18, wherein subsequent to testing, each ticket is updated by the revision control system to reflect the test results.

* * * * *